F. R. STEVENS.
STEAM ENGINE VALVE REVERSING GEAR.
APPLICATION FILED MAR. 18, 1922.
1,436,547. Patented Nov. 21, 1922.
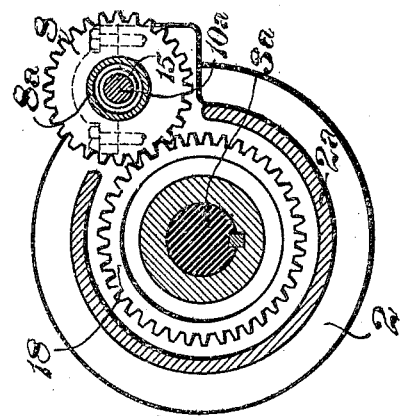
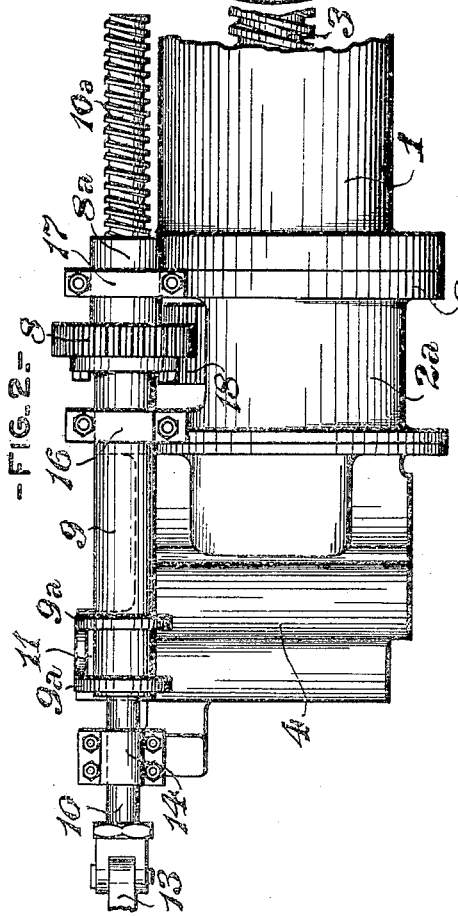
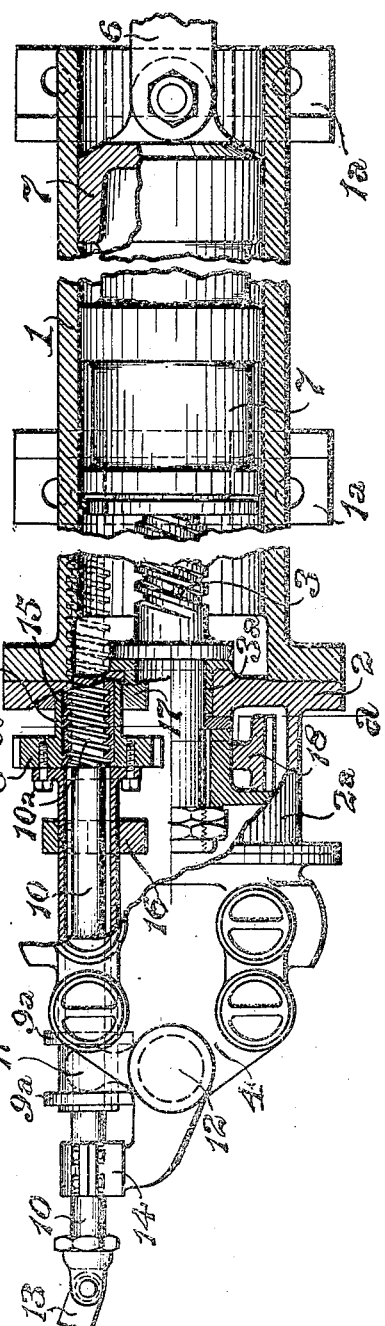
WITNESSES
INVENTOR Patented Nov. 21, 1922.

1,436,547

UNITED STATES PATENT OFFICE.

FREDERICK R. STEVENS, OF SCHENECTADY, NEW YORK.

STEAM-ENGINE-VALVE REVERSING GEAR.

Application filed March 18, 1922. Serial No. 544,699.

*To all whom it may concern:*

Be it known that I, FREDERICK R. STEVENS, of Schenectady, in the county of Schenectady and State of New York, have invented a certain new and useful Improvement in Steam-Engine-Valve Reversing Gears, of which improvement the following is a specification.

My invention relates to power actuated mechanism for reversing the valves of steam engines, and more particularly to that class or type of apparatus in which the movement is transmitted from the motor to the valve gear through the intermediation of a screw and nut. The object of my invention is to provide a mechanism of this type, which shall be of simple, compact, and inexpensive construction, with no projecting levers or other parts; with lost motion reduced to a minimum; and which shall operate with equal ease, and with regular and consistent response to the controlling movements of the hand reverse lever, in any and all positions of the gear.

The improvement claimed is hereinafter fully set forth:

In the accompanying drawings: Figure 1 is a sectional view, partly in the plane of the axis of the main cylinder and partly in the plane of the axis of the adjusting shaft and screw; Fig. 2, a plan view, with the outer end portion of the cylinder broken away; and, Fig. 3, a transverse section taken on the line $a$—$a$ of Fig. 1.

In an application for Letters Patent of the United States filed by me June 30, 1921, Serial No. 481,495, I have set forth a reversing gear, comprising a cylinder, containing a sliding plunger, coupled, at its outer end, to the valve gear, and operated by a screw, mounted axially in a thrust bearing in the head of the cylinder, and driven by a motor carried upon an extension of the cylinder head; the controlling valve of the motor being actuated in one direction by a floating lever connection with the reach rod and reverse lever, for starting the motor, and in the opposite direction by the movement of the plunger, acting, through a rod and said floating lever or linkage connection, to stop the motor.

In the practice of my present invention, I also provide a main cylinder, 1, having supporting brackets, $1^a$, $1^a$, and containing a sliding plunger, 7, adapted to be coupled at its outer end, by means of a rod, 6, to the valve gear, and operated by a screw, 3, axially mounted by means of the thrust bearing, $3^a$, in the head, 2, of the cylinder; the cylinder head being provided with an extension, $2^a$, for carrying the motor, 4, which is coupled to the thrust bearing end of the screw, 3, for driving the same. Under my present invention, the linkage connection for operating the valve, or controlling means, of the motor, is eliminated, and in lieu thereof a shaft, 10, is provided, said shaft being coupled, by means of a rod, 13, with the usual reverse lever (not shown), and having a screw, $10^a$, formed at its outer end, engaging a nut, 15, fixed within a gear, 8, and its extension hub, $8^a$. The gear, 8, at the side opposite its extension hub, is attached to a flanged sleeve, 9, surrounding the shaft, 10, and carrying the collars, $9^a$, $9^a$, between which is located the crank arm, 11, of the valve, or controlling means, 12, of the motor, 4.

The shaft, 10, with its screw, $10^a$, the gear, 8, with the hub, $8^a$, and the sleeve, 9, are mounted to slide longitudinally, parallel with the axis of the cylinder, suitable bearings being provided for this purpose, such as the bearing, 14, carried by a bracket on the casing of the motor, 4, and the bearings, 16 and 17, carried by the cylinder head extension or motor support, $2^a$. The narrow faced gear, 8, meshes with, and is adapted to be driven by, a broad faced gear, 18, which is keyed upon the end, $3^a$, of the screw, 3, and operated by a revolving member of the motor, 4.

When the hand reverse lever is moved from one position to another, the rod, 13, is shifted to slide the shaft, 10, with its screw, $10^a$, sleeve, 9, and gear, 8, longitudinally, the teeth of the spur gear, 8, sliding along the teeth of the broad faced gear, 18, with which they are in mesh. This movement of the sleeve, 9, with the collars, $9^a$, $9^a$, operates to turn the crank arm 11, of the valve, 12, of the motor, 4, and start the motor, which then rotates the reverse gear screw, 3, to slide the plunger, 7, in the cylinder, 1, and shift the valve gear to the desired position corresponding with the movement of the hand reverse lever. During this movement of the reverse gear screw, 3, the gear, 18, is also rotated to turn the gear, 8, and nut, 15, on the screw, $10^a$, and since the screw, $10^a$, is held fixed by the shaft, 10, and rod, 13, the rotation of the gear, 8, operates to shift said gear and sleeve, 9, longitudinally in the opposite direction to that in which they were moved by the reverse lever and rod, 13, and thereby actuates the crank arm, 11, to close the valve, 12, and stop the motor, this operation being repeated for each movement made by the hand reverse lever.

By means of this construction all projecting levers are eliminated, thus making a neat and compact design, with lost motion reduced to a minimum, and having the same constant relation between the moving parts at all times, whereby the operation is uniform for all positions of the gear.

I claim as my invention and desire to secure by Letters Patent:

1. In a steam engine valve reversing gear, the combination of a reverse gear screw, having connections for shifting the valve gear; a motor for operating said screw; a longitudinally movable adjusting screw; a nut engaging therewith; a gear for rotating said nut; a connection from the nut to the motor control; and means, driven by the motor, for rotating said gear.

2. In a steam engine valve reversing gear, the combination of a reverse gear screw, having connections for shifting the valve gear; a motor for operating said screw; a longitudinally movable adjusting screw; a nut engaging therewith; a gear for rotating one of said parts; a connection therefrom to the motor control; and another gear driven by the motor and meshing with the first gear.

3. In a steam engine valve reversing gear, the combination of a reverse gear screw, having connections for shifting the valve gear; a motor for operating said screw; a longitudinally movable adjusting screw; a rotatable gear, having a nut engaging said screw; a connection from said gear to the motor control; a manually actuated connection for shifting said screw and gear longitudinally; and another gear, meshing with the first and driven by the motor.

4. In a steam engine valve reversing gear, the combination of a reverse gear screw, having connections for shifting the valve gear; a motor for operating said screw; a longitudinally movable shaft and screw; a rotatable gear, having a nut engaging said screw, a sleeve, enclosing said shaft and attached to said gear; a motor control arm, engaged by said sleeve; and another gear, meshing with the first and driven by the motor.

5. In a steam engine valve reversing gear, the combination of a reverse gear screw, having connections for shifting the valve gear; a motor for operating said screw; a longitudinally movable adjusting screw; a nut, engaging therewith; a gear for rotating the nut, a connection therefrom to the motor control; and another gear, having a sliding engagement with the first gear and driven by the motor.

FREDERICK R. STEVENS.

Witnesses:
J. D. FINN,
E. HARRISON.